March 1, 1966 D. B. PORTER ETAL 3,237,775

BEADED FILTER TUBE FILTER ASSEMBLY

Filed Nov. 29, 1962

INVENTORS
RICHARD A. PAINE
DAVID B. PORTER
BY Kenway, Jenney & Hildreth
ATTORNEYS United States Patent Office 3,237,775
Patented Mar. 1, 1966

3,237,775
BEADED FILTER TUBE FILTER ASSEMBLY
David B. Porter, Watertown, and Richard A. Paine, Bedford, Mass., assignors to Millipore Filter Corporation, Bedford, Mass., a corporation of Massachusetts
Filed Nov. 29, 1962, Ser. No. 240,934
4 Claims. (Cl. 210—323)

This invention is concerned with a microporous filter assembly, and with means of securing the delicate microporous filter elements to the base member and the manifold plate of a filter assembly in a dependably leakproof manner.

Filters which can operate at high flow rates and at high pressures and which remove microscopic suspensoids from fluid media are particularly useful for oil or fuel filtering in aircraft. Such filters also find substantial use in the removal of bacteria from suspending media. These uses are rigorous and dependability is an absolute essential.

A successful type of high performance filter is composed of a multiplicity of tubes of microporous film such as that described in the applications of David P. Porter and Richard A. Paine, Serial No. 59,114, filed September 28, 1960 and Serial No. 117,450 filed June 15, 1961 and now abandoned. The applications are concerned with the assembly of a multiplicity of such tubes into a filter cartridge. The entire content of the above identified applications is hereby incorporated by reference.

Films capable of filtering microscopic particles from the suspending media are relatively delicate. Many films are used in which the volume of the pores included within the volume of the filter mass comprises 80% of the whole. The thickness of the film may range from 50 to 150 microns. Filters can be made to remove particles as small as 1/100,000 of a millimeter, which corresponds to an effective pore size of about 10 millimicrons. A filter such as this cannot operate at high flow rates and at relatively high pressures (10 lbs.) unless it is supported.

In the design of filter described by Porter and Paine (supra) the support is a perforated tube. Its multiple perforations comprise about 25% of its surface area. In application Serial No. 59,114, it is disclosed that the surface film does not have to lie in direct contact with the support but instead, if a very narrow spacing exists between the microporous film and the perforated support, the film receives sufficient support from the perforated tube and becomes capable of filtering over the whole of its surface area, not merely through the 25% which lies directly over the perforation.

In the design of the filter cartridge disclosed in the above identified Porter and Paine applications, a multiplicity of these tubes is assembled on a base plate and all the tubes are fastened to the base by a bedding cement. The upper ends of the tubes pass through apertures formed in a manifold plate and again, these are fastened to the manifold plate by bedding cement.

A principal object of the present invention is substantially to improve the performance of such filter assemblies particularly by preventing rupture of the microporous film at or near the point of its attachment to the base or to the manifold plate.

We have found that if a zone of an adherent and somewhat elastic substance is applied as a bead about the exterior wall of the microporous filter tube immediately adjacent each end of the tube and the beaded tubes are then bedded in the cementitious material both at the base and at the manifold end of the tube, the microporous filter tubes are less subject to failure than is the case when the tubes are directly bedded in the potting compound cement. We attribute the superior performance which this invention achieves to the fact that the elastic bead distributes the stress at the anchoring points over a wider area and responds to the forces involved by yielding sufficiently to prevent the rupture of these relatively delicate films. The invention may be best understood by reference to the drawings in which FIG. 1 is an elevation partially in section of a filter cartridge;

Figure 1:
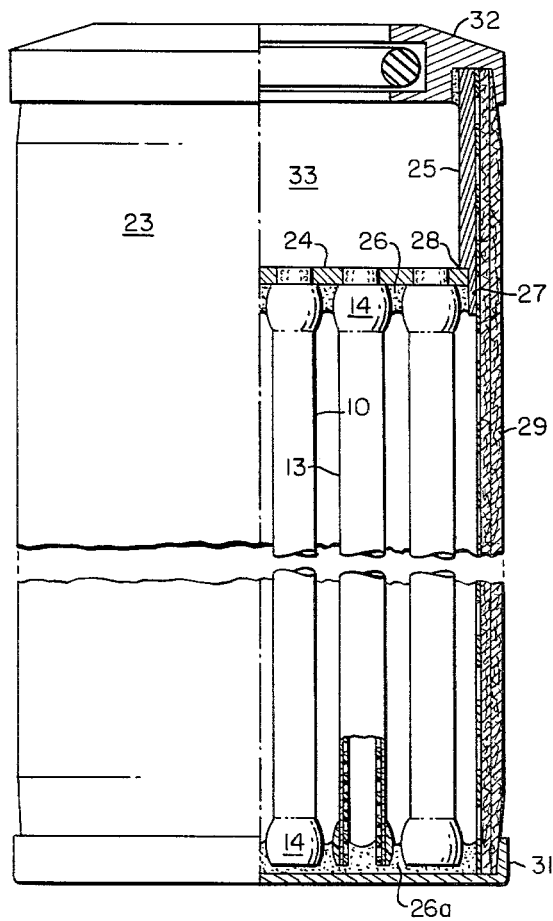
Figure 2:
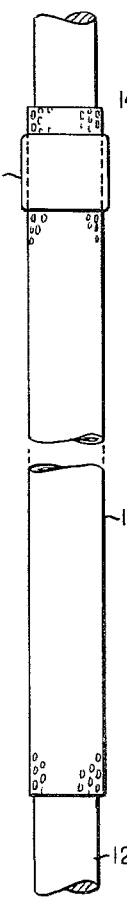
FIG. 2 is an elevation of a perforated metallic support tube mounted on a removable mandrel.

The filter comprises a perforated tube 10, the upper end of which is surrounded by a spacing and reinforcing collar 11, which is fixed to the tube 10, just below its upper extremity. The tubes 10, temporarily mounted on mandrels 12, are then coated by dipping in the manner described in the Porter and Paine application, Serial No. 59,114 with a substance which when dried in a carefully controlled manner, e.g., that disclosed by Zygmondy in U.S. Patent 1,421,341, becomes the tubular film microporous filtering medium 13.

Figures 3, 4:
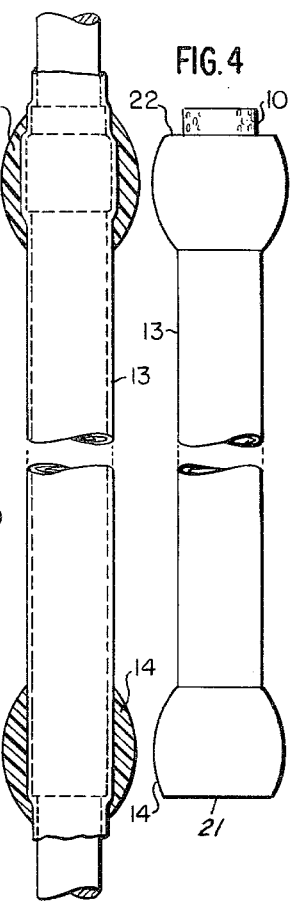
FIG. 3 is an elevation of the tube of FIG. 2 after it has been coated with the microporous film and subsequent to the application of the "beads"
FIG. 4 is an elevation of the finished tube ready for assembly.

Elastic beads 14 are then formed adjacent each end of the film as shown in FIG. 3. The essential requirements of the composition which forms the bead are insolubility in the fluid to be filtered, good adhesion to the plastic filter tube and to the bedding cement, and ability to solidify into a permanently elastic mass. Accordingly, a considerable choice of suitable materials exists—plastisols, particularly polyvinylchloride suspended in an insoluble plasticizer, satisfy a wide range of requirements and permit a high rate of production because of the speed at which "fluxing" occurs. But if the material to be filtered tends to extract the plasticizer, compounds either similar to or identical with "container sealing compositions" may be used. These compositions are, essentially, fluid suspensions of ruber and/or other difficultly soluble elastomers. When dried, they as do plastisols after fluxing, become a solid, permanently elastic mass.

Figure 5:
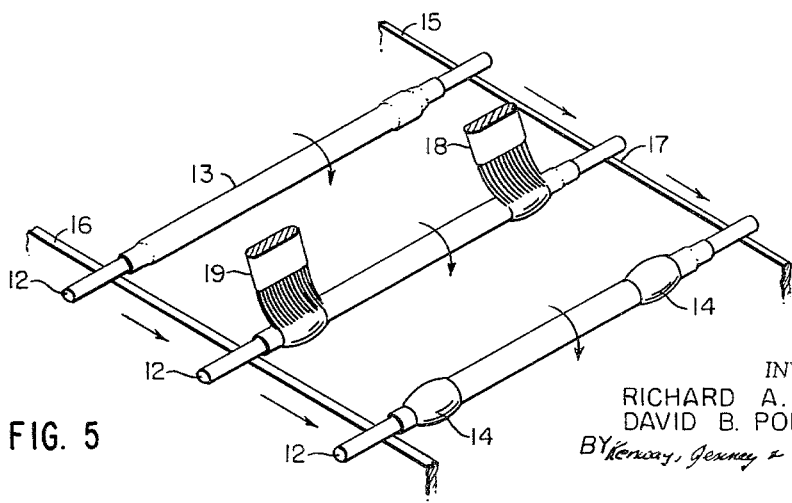
FIG. 5 is illustrative of the method by which the "beads" are applied.

The beads may be applied by painting a stripe of the fluid composition around the tube adjacent each end, but because of the great number of tubes which must be so treated, we have developed an automatic method of applying the composition which is diagrammatically illustrated in FIG. 5.

In practicing this method, tubes with the dry microporous coating 13 in place and still mounted on their mandrels 12, are caused to roll down an inclined trackway formed by two upstanding side rails, 15 and 16, spaced apart a distance greater than the length of the tubes so that only the projecting ends of the mandrels contact the rails. At a point 17, in the descent of the tubes along the rails, the tubes pass under two compound applicator elements, here shown as the brushes, 18 and 19, which feed the compound onto the filter tubes adjacent their ends. For clarity in illustration, devices which hold the rolling mandrels and the tubes in proper relation to the applicators have not been shown. They can be, e.g., properly positioned spring washers snapped over the ends of each mandrel, or fixed side-guides which position the mandrel laterally on the rails. Brushes 18 and 19 are but illustrative of one mode of applying the liquid composition. Other methods are equally operative. For example, the compound can be ejected onto the tubes through small electropneumatically operated nozzles such as are used to supply container sealing compound to the closures of miniature containers. The bead of composition builds up as the tube rotates beneath the brushes 18 and 19, or beneath applicator heads. Should the compound be highly viscous so that its drag checks the revolution of the tube, a small powered friction roller may be caused to engage an exposed end of the mandrel at the applicator station and cause the mandrel to turn.

Following the application of the composition, the tubes roll into a heated chamber where, if the composition be a plastisol, it is fluxed, i.e., reaches the critical temperature at which the suspended particles of resin dissolve in the plasticizer. Cooling the extremely viscous mass then converts the plastisol into a permanent elastic jell. If the mass be a sealing composition, the heating is continued until the suspending medium is driven off.

Subsequent to cooling, the bead, which is now solid, is trimmed so that its lower edge 21 is flush with the end of the tube 13, and its upper edge 22 is flush with the upper end of the collar 11. Tubes are then assembled in parallel spaced array in the filter cartridge, generally indicated at 23 (FIG. 1), in the manner which follows.

Completed tubes as shown in FIG. 4, are held in a fixture which is provided with the desired number of locating pins over which the lower end of each tube is fitted. That portion of the support tube 10, which projects above collar 11, is fitted through the appropriate aperture in manifold plate 24, and the plate is pushed down against the upper margin of the beads 14, in each case forming a pressure seal against the trimmed face of the bead which prevents the ingress of cement. Plate 24 is then fitted into the spacing collar 25. The assembled array is then reversed and an activated epoxy resin potting compound 26 is flowed in about the beads.

As the compound cures, it adheres to the manifold plate 24, and to the beads 14. At the same time the potting resin also adheres to the projecting skirt 27, which extends from the collar 25, below the shoulder 28. When the potting compound is set, the fixture is removed. The assembly is then reversed and slid into a porous walled jacket 29, which performs the function of a pre-filter as described in patent application No. 117,450. The pre-filter jacket and the array of tubes are then pushed home into a skirted base plate 31, in which there is a supply of activated but fluid potting compound. As in the case of the seal made against the manifold plate, this material cures and seals not only the lower beads 14, but also the lower end of the tubes 10, and the pre-filter jacket 29, to the base 31.

The assembly is completed by cementing the cap 32, to the spacing collar 25, and to the pre-filter jacket 29, leaving a header space 33, in which the filtered fluid may accumulate before passing out through a conduit aperture which is not shown in the drawings.

As FIG. 1 shows, the beads 14 extend beyond the relatively rigid potting masses 26 and 26a, and since the fluxed plastisol or solid sealing composition of which the beads are composed is somewhat elastic and resilient, any strain on the film 13 is not concentrated at the cement line but is distributed over a considerably wider area. Probably, the point values of localized strain on the film are reduced. At any event, the performance of filters assembled in the manner which has just been described is considerably bettered. Failure of the film adjacent the cementing lines which sometimes occurs when the beads, 14—14, are absent, is substantially eliminated.

In use, this replaceable filter assembly is enclosed in a tank. The fluid flow is as follows: Raw fluid under pressure enters the tank and passes through the walls of the pre-filter jacket 29, where large particles are filtered out. After passing through the pre-filter 29, the fluid passes through the filter film 13. The fluid, now freed of even microscopic particles, finds its way through the many apertures in the tube 10, and passes out of the tube above the manifold plate 24, into the header space 33. It leaves the filter through a conduit (not shown).

The mechanical features of the above filter assembly have been presented by way of a preferred example. The invention is useful in other mechanical arrangements which will readily occur to those familiar with the microporous filter art.

Having thus disclosed our invention, we claim and desire to secure by Letters Patent:

1. In a microporous filter cartridge having a tubular wall, base, cap, and manifold plate elements, and a plurality of filter tubes extending between said base and the manifold plate in spaced array, each of said filter tubes comprising a rigid perforated tube and a thin microporous film loosely overlying said tube, the bore space of said filter tubes being in communication with space above said manifold plate, means to relieve stress on the film of each tube imposed adjacent its ends comprising a bead of an elastic substance secured to the exterior wall of the tube adjacent each end thereof along a substantial axial extent thereof and a resinous potting compound disposed on said base and said plate in sealing contact with each bead to adhesively secure the base and the plate to the elastic beads.

2. A filter cartridge assembly comprising in combination, a plurality of rigid tubes each formed with a multiplicity of perforations in its tubular wall, a plurality of continuous, thin, flexible microporous filter films having substantially transverse pores, each of said filter films loosely overlying the outer periphery of one of said tubes, each end of the plastic film being surrounded by a bead of an elastic substance adhesively secured to the exterior surface of the plastic film along a substantial axial extent thereof, a manifold plate receiving one end of each of the tubes, a base supporting the other end of each of the tubes, and each of the said plastic films being secured to the manifold plate and the base plate respectively by a resinous potting compound in adhesive contact with the manifold plate and base and with the beads to maintain the films in sealed relationship with the manifold and base, and a casing surrounding the assembly.

3. A microporous filter cartridge including a chamber formed of wall, base and apertured manifold plate elements, having a plurality of filter elements extending between the base and the manifold plate each of which comprise a perforated rigid support and a microporous filter film loosely overlying the support, a bead of an elastic substance bonded to the film adjacent each of its ends along a substantial axial extent thereof, the filter elements being secured to the base by an adhesive bedding cement, thereby effectively closing the lower end of each tube and securing the same to the base, the upper ends of each filter element being secured to the manifold by a bedding cement in adhesive contact solely with the beads and with the intermediate exposed areas of the manifold plate.

4. A filter element suitable for incorporation in multiple filter cartridges comprising in combination, a rigid tube having a plurality of wall perforations, a continuous, thin, flexible, plastic film having substantially transverse pores of microscopic dimensions overlying the outer periphery of said tube, each end of the tube being surrounded by a bead of an elastic substance adhesively secured to the exterior surface of the elastic film along a substantial axial extent thereof, the said elastic bead being adapted to be adhesively secured by a resinous potting compound whereby the tube may be securely sealed to elements of a filter cartridge.

References Cited by the Examiner

UNITED STATES PATENTS

| | | | |
|---|---|---|---|
| 2,088,542 | 7/1937 | Westin | 117—43 |
| 2,134,739 | 11/1938 | Schutz | 117—43 |
| 2,440,487 | 4/1948 | Rayburn | 210—323 X |
| 2,754,972 | 7/1956 | McCann | 210—451 X |
| 2,907,466 | 10/1959 | Beddow | 210—457 |
| 2,913,118 | 11/1959 | Coleman et al. | 210—315 |

FOREIGN PATENTS 1,271,222  7/1961  France.

REUBEN FRIEDMAN, *Primary Examiner.*

HARRY B. THORNTON, *Examiner.*